US 12,085,074 B2

(12) United States Patent
Tamura et al.

(10) Patent No.: US 12,085,074 B2
(45) Date of Patent: Sep. 10, 2024

(54) ELECTROMAGNETIC VALVE MECHANISM AND HIGH-PRESSURE FUEL SUPPLY PUMP

(71) Applicant: Hitachi Astemo, Ltd., Hitachinaka (JP)

(72) Inventors: Shingo Tamura, Hitachinaka (JP); Hiroyuki Yamada, Hitachinaka (JP); Kiyotaka Ogura, Hitachinaka (JP); Minoru Hashida, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 134 days.

(21) Appl. No.: 17/777,682

(22) PCT Filed: Oct. 30, 2020

(86) PCT No.: PCT/JP2020/040756
§ 371 (c)(1),
(2) Date: May 18, 2022

(87) PCT Pub. No.: WO2021/100439
PCT Pub. Date: May 27, 2021

(65) Prior Publication Data
US 2023/0003215 A1    Jan. 5, 2023

(30) Foreign Application Priority Data

Nov. 19, 2019  (JP) .................................. 2019-208406

(51) Int. Cl.
*F04B 53/10*  (2006.01)
*F16K 27/02*  (2006.01)
*F16K 31/06*  (2006.01)

(52) U.S. Cl.
CPC ........ *F04B 53/1082* (2013.01); *F16K 27/029* (2013.01); *F16K 31/0655* (2013.01); *F16K 31/0675* (2013.01)

(58) Field of Classification Search
CPC ..................... F16K 31/0675; F04B 53/1082
See application file for complete search history.

(56) References Cited

U.S. PATENT DOCUMENTS

| 8,985,973 B2 * | 3/2015 | Usui ..................... F16K 15/026 |
| | | 417/505 |
| 10,704,486 B2 * | 7/2020 | Kusakabe .............. F02M 61/10 |

(Continued)

FOREIGN PATENT DOCUMENTS

| EP | 3 315 760 A1 | 5/2018 |
| JP | 2015-108409 A | 6/2015 |

(Continued)

OTHER PUBLICATIONS

International Search Report with English Translation in related Application No. PCT/JP2020/040756 dated Jan. 19, 2021 (4 pages).

(Continued)

*Primary Examiner* — Michael R Reid
(74) *Attorney, Agent, or Firm* — Foley & Lardner LLP

(57) ABSTRACT

An object of the present invention is to secure a gap between a component on a suction valve side and a component on an anchor side when a valve is closed, regardless of an integration tolerance of a plurality of components, and to be able to reliably close the valve. In an electromagnetic valve mechanism 300 including an anchor assembly 36 and a magnetic core 33 between which a magnetic attraction force acts, and a suction valve 30 configured to be able to come into and out of contact with the anchor assembly 36, the anchor assembly 36 includes a first anchor assembly component 36a having a facing surface 36ab that faces the magnetic core 33, a second anchor assembly component 36b configured integrally with the first anchor assembly component 36a, and a press-fitting portion 36c that fixes the first anchor assembly component 36a and the second anchor assembly component 36b. A press-fitting length L1 of the press-fitting portion 36c is set to a length at which the second anchor assembly component 36b and the suction valve 30

(Continued)

are separated from each other in a state where the suction valve 30 is closed.

8 Claims, 6 Drawing Sheets

(56) References Cited

U.S. PATENT DOCUMENTS

| | | | |
|---|---|---|---|
| 10,731,615 B2* | 8/2020 | Kusakabe | F02M 59/466 |
| 10,883,434 B2* | 1/2021 | Miyake | F02M 61/10 |
| 2009/0120412 A1 | 5/2009 | Tokuo et al. | |

FOREIGN PATENT DOCUMENTS

| | | |
|---|---|---|
| JP | 2015-190532 A | 11/2015 |
| JP | 2019-027355 A | 2/2019 |
| WO | WO 2019/097915 A1 | 5/2019 |

OTHER PUBLICATIONS

German Office Action issued in counterpart German Patent Application No. 112020004803.9 dated Apr. 4, 2024 with English translation. (17 pages).

* cited by examiner

ELECTROMAGNETIC VALVE MECHANISM AND HIGH-PRESSURE FUEL SUPPLY PUMP

TECHNICAL FIELD

The present invention relates to a high-pressure fuel supply pump that pressure-feeds fuel to a fuel injection valve of an internal combustion engine, and, particularly to a fuel supply pump including an electromagnetic suction valve that adjusts an amount of fuel to be discharged.

BACKGROUND ART

In a direct injection type internal combustion engine that directly injects fuel into a combustion chamber in an internal combustion engine of an automobile or the like, a high-pressure fuel supply pump including an electromagnetic suction valve, that is capable of increasing pressure of fuel, adjusting the fuel to have a desired fuel flow rate, and then discharging the fuel is widely used.

For example, an electromagnetic suction valve in a high-pressure fuel supply pump of JP 2019-27355 A (PTL 1) includes an anchor that moves by a magnetic attraction force, a rod that is engaged with the anchor and moves together with the anchor, and a valve body that is configured separately from the rod and moves by being engaged with the rod (the paragraphs 0044 and 0052 to 0055). The electromagnetic suction valve is a normally-open type electromagnetic suction valve in which the valve body is closed by energizing an electromagnetic coil and is opened when a current to the electromagnetic coil is cut off. In a state where the anchor is in contact with a magnetic core, a gap exists between the rod and the valve body. In a case where such a gap does not exist, contact of the valve body with a valve seat is not possible, and the valve can be closed (paragraph 0056).

CITATION LIST

Patent Literature

PTL 1: JP 2019-27355 A

SUMMARY OF INVENTION

Technical Problem

When an electromagnetic suction valve is configured as in the high-pressure fuel supply pump disclosed in PTL 1, in order to secure a gap between a component on the valve body (referred to as a suction valve below) side and a component on the rod side (that is, component on the anchor side) when the valve is closed, it is necessary to set a dimensional tolerance related to the gap to be small in a plurality of components related to the gap.

In addition, even though the dimensional tolerance related to the gap is reduced, securing the gap may not be possible due to integration of tolerance variations because the number of components related to the gap is large. In this case, steps of taking out a partial assembly in the middle of assembly, measuring the dimensions of a portion related to the gap, and then selecting a height adjusting shim suitable for the dimensions, performing assembling, and the like are required.

An object of the present invention is to provide an electromagnetic valve mechanism and a high-pressure fuel supply pump capable of securing a gap between a component on a suction valve side and a component on an anchor side when a valve is closed, regardless of an integration tolerance of a plurality of components.

Solution to Problem

To achieve the above object, according to the present invention, an electromagnetic valve mechanism includes an anchor assembly and a magnetic core between which a magnetic attraction force acts, and a suction valve configured to be able to come into and out of contact with the anchor assembly. The anchor assembly includes a first anchor assembly component having a facing surface that faces the magnetic core, a second anchor assembly component configured integrally with the first anchor assembly component, and a press-fitting portion that fixes the first anchor assembly component and the second anchor assembly component. A press-fitting length of the press-fitting portion is set to a length at which the second anchor assembly component and the suction valve are separated from each other in a state where the suction valve is closed.

To achieve the above object, according to the present invention, a high-pressure fuel supply pump includes an electromagnetic valve mechanism constituting a variable capacity mechanism. The electromagnetic valve mechanism includes an anchor assembly and a magnetic core between which a magnetic attraction force acts, and a suction valve configured to be able to come into and out of contact with the anchor assembly. The anchor assembly includes a first anchor assembly component having a facing surface that faces the magnetic core, a second anchor assembly component configured integrally with the first anchor assembly component, and a press-fitting portion that fixes the first anchor assembly component and the second anchor assembly component. A press-fitting length of the press-fitting portion is set to a length at which the second anchor assembly component and the suction valve are separated from each other in a state where the suction valve is closed.

Advantageous Effects of Invention

According to the present invention, it is possible to provide an electromagnetic valve mechanism and a high-pressure fuel supply pump capable of securing a gap between a suction valve and a rod when a valve is closed, regardless of an integration tolerance of a plurality of components.

Objects, configurations, and advantageous effects other than those described above will be clarified by the descriptions of the following embodiments.

DESCRIPTION OF EMBODIMENTS

Hereinafter, examples according to the present invention will be described in detail.

Figure 1:
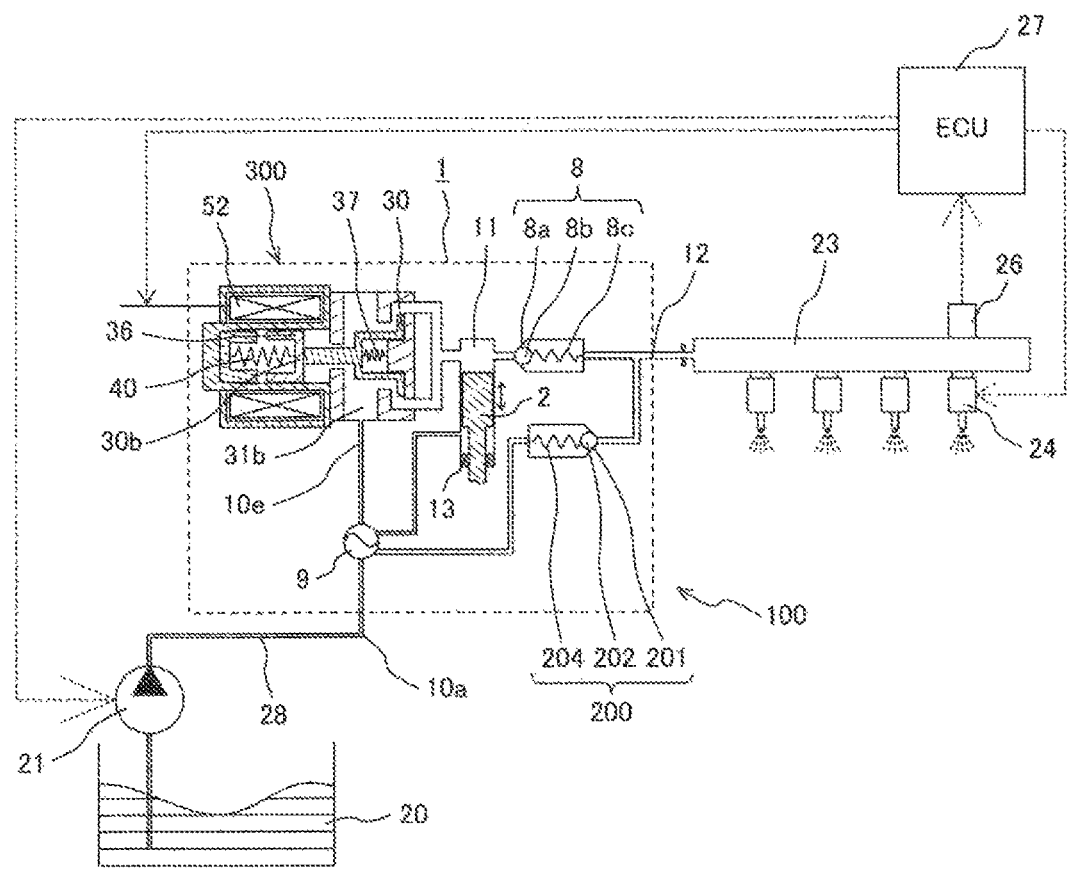
FIG. 1 is an overall configuration diagram illustrating an example of an engine system to which a high-pressure fuel supply pump according to the present invention is applied.

First, an overall configuration and an operation of an engine system to which a high-pressure fuel supply pump according to the present invention is applied will be described with reference to FIG. 1. FIG. 1 is an overall configuration diagram illustrating an example of the engine system to which the high-pressure fuel supply pump according to the present invention is applied.

A portion 1 surrounded by a broken line in FIG. 1 indicates a main body of a high-pressure fuel supply pump (referred to as a high-pressure fuel pump below) 100. Mechanisms and components indicated within the broken line are integrally incorporated in a pump body 1 constituting the main body. FIG. 1 is a view schematically illustrating a configuration of the engine system. A detailed configuration of the high-pressure fuel pump is different from a configuration of a high-pressure fuel supply pump in FIG. 2 and the subsequent drawings.

In the following description, a description may be made by designating an up-down direction, but the up-down direction is based on FIG. 2 and does not necessarily coincide with an up-down direction in a case where the high-pressure fuel pump 100 is mounted on an engine. In the following description, an axial direction is defined by a center axis 2A (see FIG. 2) (longitudinal direction) of a plunger 2.

Figure 3:
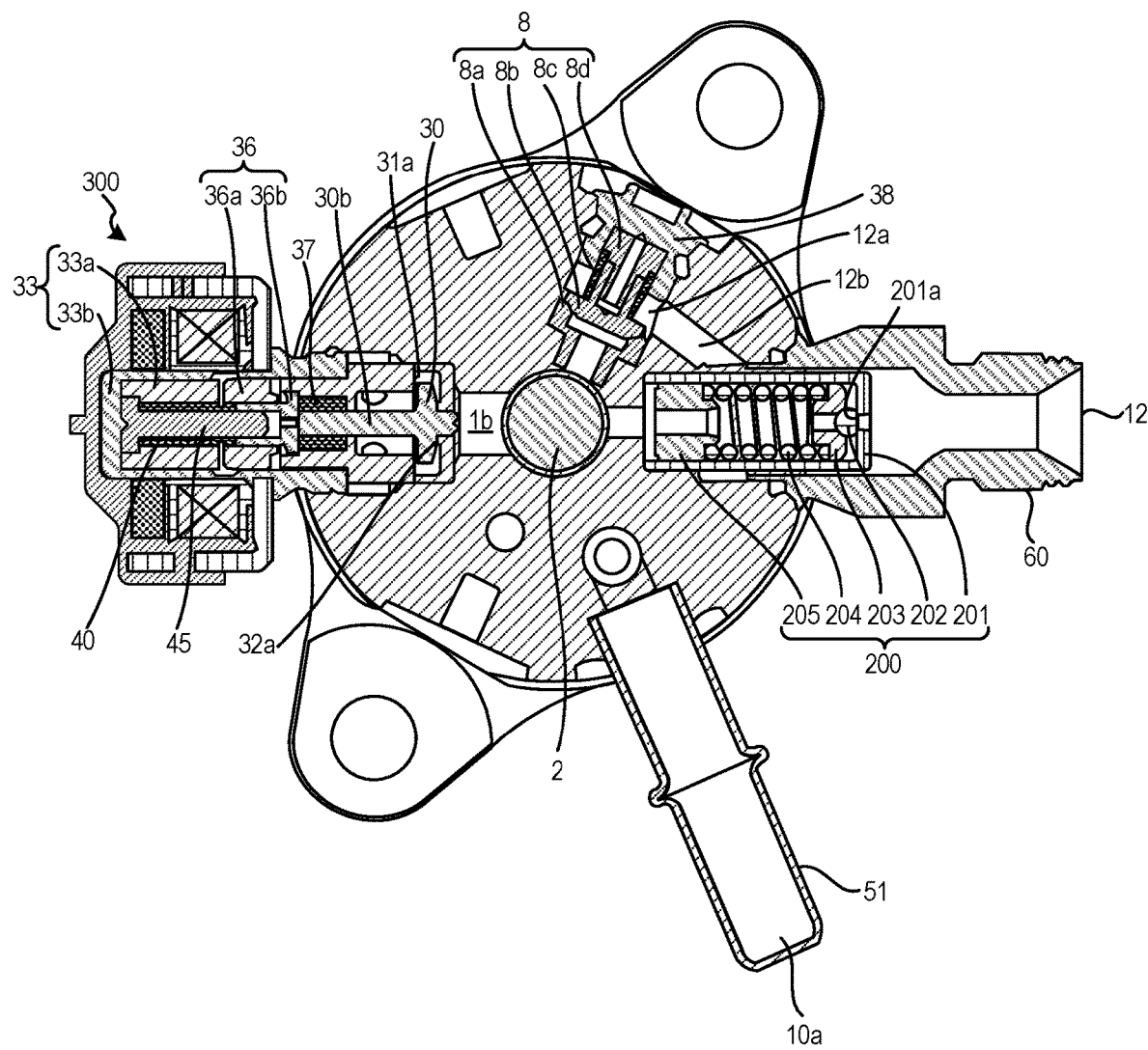
FIG. 3 is a cross-sectional view when a cross section (horizontal cross section) perpendicular to the axial direction of the plunger of the high-pressure fuel supply pump in FIG. 2 is viewed from the top in FIG. 2.
Figure 4:
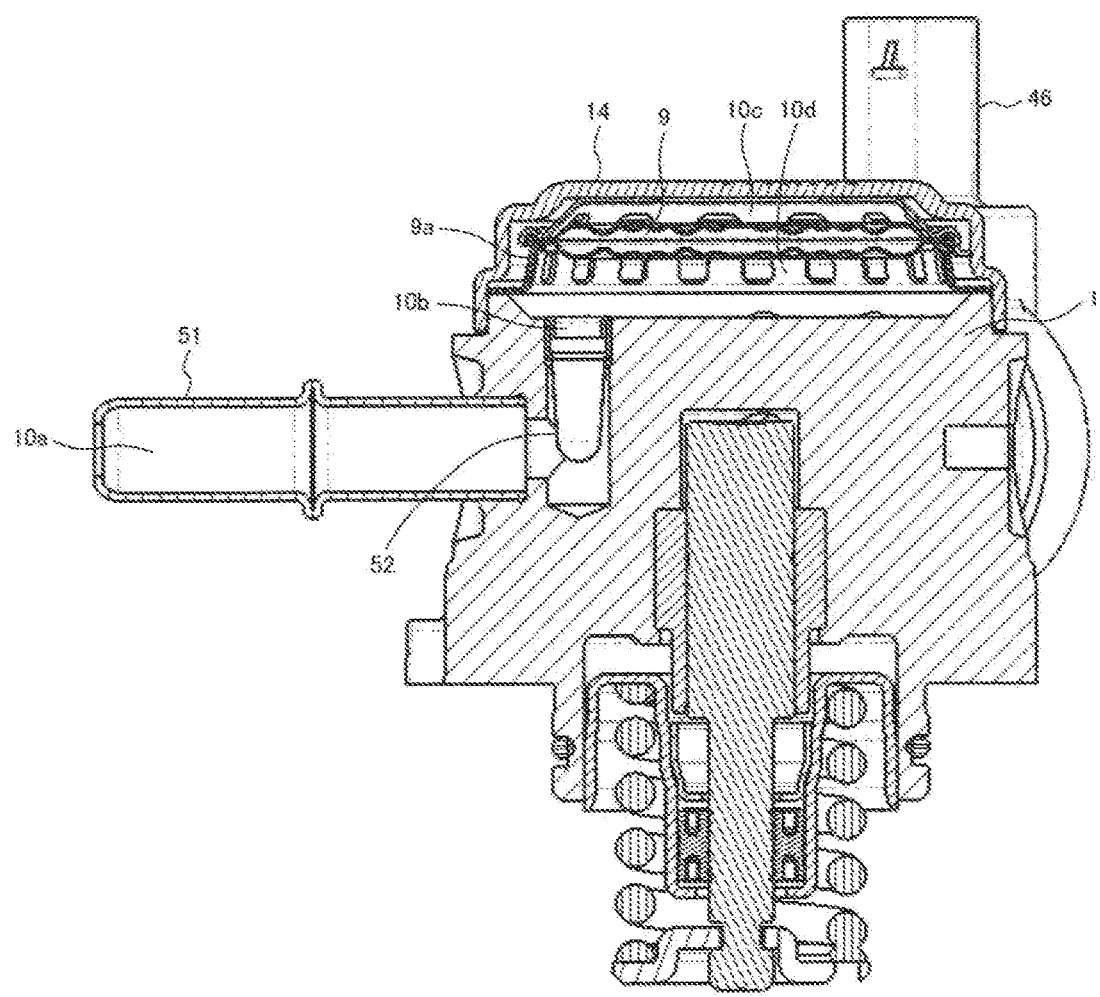
FIG. 4 is a vertical cross-sectional view when the high-pressure fuel supply pump in FIG. 2 is viewed from a direction different from a direction in FIG. 2.

Fuel in a fuel tank 20 is pumped up by a feed pump 21 based on a signal from an engine control unit 27 (referred to as an ECU below). The fuel is pressurized to the appropriate feed pressure and transmitted to a low-pressure fuel suction port 10a of the high-pressure fuel pump 100 through a suction pipe (low-pressure pipe) 28. As illustrated in FIGS. 3 and 4, the low-pressure fuel suction port 10a includes a suction joint 51.

The fuel that has passed through the low-pressure fuel suction port 10a reaches a suction port 31b of an electromagnetic valve mechanism 300 constituting a variable capacity mechanism, via damper chambers 10c and 10d (see FIGS. 2 and 4) in which a pressure pulsation reduction mechanism 9 is disposed. Specifically, the electromagnetic valve mechanism 300 constitutes an electromagnetic suction valve mechanism.

The fuel flowing into the electromagnetic valve mechanism 300 passes through a suction port that is opened and closed by a suction valve (valve body) 30, and then flows into a pressurizing chamber 11. Power for reciprocating motion is applied to the plunger 2 by a cam mechanism 93 (see FIGS. 2 and 4) of the engine.

In a downward stroke of the plunger 2, the fuel is sucked into the pressurizing chamber 11 from the suction port opened and closed by the suction valve 30. In an upward stroke, the fuel in the pressurizing chamber 11 is pressurized. The pressurized fuel is pressure-fed to a common rail 23 on which a pressure sensor 26 is mounted, via a discharge valve mechanism 8.

An injector 24 injects fuel into a combustion chamber of the engine based on a signal from the ECU 27. The high-pressure fuel supply pump 100 in the present example is applied to a so-called direct injection engine system in which the injector 24 directly injects fuel into the combustion chamber of the engine.

In the high-pressure fuel supply pump 100, the electromagnetic valve mechanism 300 is controlled by a signal transmitted from the ECU 27 to the electromagnetic valve mechanism 300, and a desired fuel flow rate is discharged through a fuel discharge port 12.

Next, a detailed structure of the high-pressure fuel supply pump 100 to which the present invention is applied will be described with reference to FIGS. 2 to 4. FIG. 2 is a cross-sectional view illustrating a cross section (vertical cross section) parallel to the axial direction of the plunger of the high-pressure fuel supply pump according to the example of the present invention. FIG. 3 is a cross-sectional view when a cross section (horizontal cross section) perpendicular to the axial direction of the plunger of the high-pressure fuel supply pump in FIG. 2 is viewed from the top in FIG. 2. FIG. 4 is a vertical cross-sectional view when the high-pressure fuel supply pump in FIG. 2 is viewed from a direction different from a direction in FIG. 2.

Figure 2:
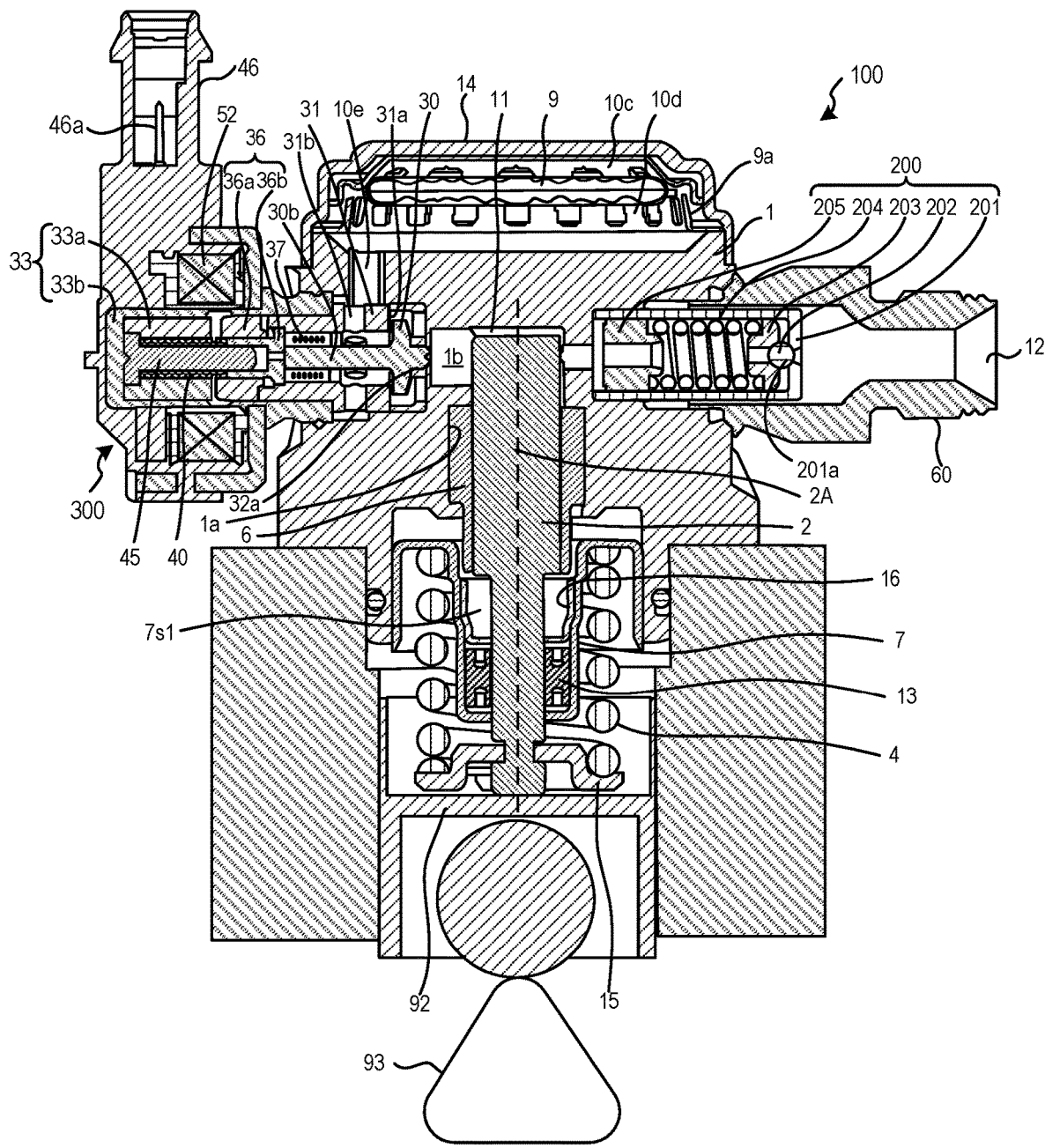
FIG. 2 is a cross-sectional view illustrating a cross section (vertical cross section) parallel to an axial direction of a plunger of a high-pressure fuel supply pump according to an example of the present invention.

As illustrated in FIGS. 2 and 4, a cylinder 6 is attached to the pump body 1. The cylinder 6 guides the reciprocating motion of the plunger 2 and forms the pressurizing chamber 11 together with the pump body 1. That is, the plunger 2 reciprocates in the cylinder 6 to change the volume of the pressurizing chamber 11.

An insertion hole 1a for inserting the cylinder 6 from the lower side is formed in the pump body 1. The cylinder 6 is press-fitted into the insertion hole 1a of the pump body 1 and fixed to the pump body 1.

The cam mechanism 93 provided on a cam shaft or the like of an internal combustion engine is disposed at a lower end of the plunger 2. The rotational motion of the cam mechanism 93 is converted into an up-down motion of the plunger 2. A tappet 92 that transmits the movement from the cam mechanism 93 to the plunger 2 is provided between the cam mechanism 93 and the plunger 2. The plunger 2 is crimped to the tappet 92 by a plunger biasing spring 4 via a retainer 15.

A plunger seal 13 is held at the lower end portion of the inner periphery of a seal holding member 7, and is installed in a state of being slidably in contact with the outer periphery of the plunger 2 in the lower portion of the cylinder 6 in FIGS. 2 and 4. When the plunger 2 slides, the plunger seal 13 seals the fuel in an auxiliary chamber 7s1 to prevent flowing of the fuel into the internal combustion engine. At the same time, the plunger seal 13 prevents flowing of lubricating oil (including engine oil) that lubricates a sliding portion in the internal combustion engine, into the pump body 1.

A regulating member 16 that prevents the plunger 2 from coming into contact with the plunger seal 13 is attached to an upper portion of the plunger seal 13 in a state where the high-pressure fuel pump 100 is not attached to the engine.

As illustrated in FIGS. 2 and 3, the suction joint 51 is attached to a side surface portion of the pump body 1. The suction joint 51 is connected to the suction pipe 28 for supplying the fuel from the fuel tank 20 to the high-pressure fuel pump 100. The fuel is supplied from the suction joint 51 into the high-pressure fuel pump 100. As illustrated in FIG. 4, the fuel that has passed through the low-pressure fuel suction port 10a configured by the suction joint 51 is directed to the damper chambers 10c and 10d in which the pressure pulsation reduction mechanism 9 is disposed, through a low-pressure fuel suction passage 10b extending in the up-down direction in the pump body 1. A suction filter disposed in the low-pressure fuel suction passage 10*b* prevents foreign matter existing between the fuel tank 20 and the low-pressure fuel suction port 10*a*, from being absorbed into the high-pressure fuel pump 100 by the flow of the fuel.

The pressure pulsation reduction mechanism 9 is disposed in the damper chambers 10*c* and 10*d* between a damper cover 14 and the upper end surface of the pump body 1, and is supported from the lower side by a holding member 9*a* disposed on the upper end surface of the pump body 1.

The damper chambers 10*b* and 10*c* communicating with the low-pressure fuel suction port 10*a* and the low-pressure fuel suction passage 10*b* are formed on upper and lower surfaces of the pressure pulsation reduction mechanism 9. Although not shown in the drawing, a passage for causing the upper side and the lower side of the pressure pulsation reduction mechanism 9 with each other is formed in the holding member 9*a*.

As illustrated in FIG. 2, the fuel that has passed through the damper chambers 10*b* and 10*c* then reaches a suction passage 31*b* of the electromagnetic valve mechanism 300 via a low-pressure fuel suction passage 10*e* formed in the pump body 1 to extend in the up-down direction. The suction passage 31*b* is formed in a suction valve seat member 31 forming a suction valve seat 31*a* in the up-down direction.

As illustrated in FIG. 2, a terminal 46*a* is molded integrally with a connector 46, and an unmolded end portion is configured to be connectable to the engine control unit 27 side.

The electromagnetic valve mechanism 300 will be described with reference to FIGS. 2 and 3.

In a case where the plunger 2 moves along the outer peripheral shape of the cam mechanism 93 by the rotation of the cam mechanism 93 and is in a suction stroke state, the volume of the pressurizing chamber 11 increases and the fuel pressure in the pressurizing chamber 11 decreases. When the fuel pressure in the pressurizing chamber 11 becomes lower than the pressure in the suction passage 31*b* in this stroke, the suction valve 30 is opened. When the suction valve 30 is in the maximum lift state, the suction valve 30 comes into contact with a stopper portion 32*a*. When the suction valve 30 is lifted from the suction valve seat 31*a*, a suction port between the suction valve seat 31*a* and the suction valve 30 is opened, and the electromagnetic valve mechanism 300 is opened.

The fuel passes through the suction port between the suction valve seat 31*a* and the suction valve 30, and flows into the pressurizing chamber 11 through a fuel passage hole 1*b* formed in the pump body 1 in a lateral direction.

When the plunger 2 further moves along the outer peripheral shape of the cam mechanism 93 and ends the suction stroke, the plunger 2 transitions to the upward stroke by performing an upward motion. Here, an electromagnetic coil 43 maintains a non-energized state.

In the present example, a magnetic core 33 is an assembly of an outer core 33*b* and an inner core 33*a* disposed at the inner peripheral portion (radially inner side) of the outer core 33*b*, and is configured by the outer core 33*b* and the inner core 33*a*. The magnetic core 33 may also be referred to as a core. Meanwhile, an anchor assembly 36 is an assembly of an anchor (first anchor assembly component) 36*a* and an anchor sleeve (second anchor assembly component) 36*b*, and is configured by the anchor 36*a* and the anchor sleeve 36*b*. The anchor 36*a* has a facing surface (magnetic attraction surface) 36*ab* that faces the magnetic core 33, and is configured integrally with the anchor sleeve 36*b*.

The magnetic core 33 and the anchor assembly 36 are configured such that a magnetic attraction force acts between the magnetic core 33 and the anchor assembly 36. More specifically, a magnetic biasing force acts between the inner core 33*a* and the anchor 36*a*. Here, in a case where the electromagnetic coil 43 is in the non-energized state, no magnetic biasing force acts between the magnetic core 33 and the anchor 36*a*. An anchor spring (anchor biasing spring, first spring) 40 biases the suction valve 30 in a valve opening direction via the anchor assembly 36. The suction valve 30 has a rod (rod portion) 30*b* that is integrally formed, on a side facing the anchor assembly 36, and is biased in the valve opening direction by the anchor spring 40 biasing the rod 30*b* in the valve opening direction.

The biasing force of the anchor spring 40 is set to have a biasing force necessary and sufficient to maintain the suction valve 30 to be opened in the non-energized state. The volume of the pressurizing chamber 11 decreases with the upward movement of the plunger 2. In this state, the fuel once sucked into the pressurizing chamber 11 is brought back to the low-pressure fuel suction passage 10*e* through the suction port of the suction valve 30 in a valve open state again. Thus, the pressure in the pressurizing chamber 11 does not increase. Such a stroke is referred to as a return stroke.

In this state, when a control signal from the ECU 27 is applied to the electromagnetic valve mechanism 300, a current flows through the electromagnetic coil 43 via the terminal 46. Thus, a magnetic attraction force acts between the magnetic core 33 and the anchor 36*a*, and the magnetic attraction force overcomes the biasing force of the anchor spring 40 to bias the anchor 36*a* in a valve closing direction. As a result, the magnetic core 33 and the anchor 36*a* come into contact with each other on magnetic attraction surfaces 33*aa* and 36*ab*.

The suction valve 30 is configured to be able to come into and out of contact with the anchor assembly 36, and is biased by a suction valve spring (suction valve biasing spring, second spring) 37 in a direction of abutting on the anchor assembly 36 (valve closing direction). More specifically, the suction valve 30 is configured such that the rod 30*b* abuts on the anchor sleeve 36*b*. Therefore, when the anchor 36 moves toward the magnetic core 33, the suction valve 30 moves toward the magnetic core 33 together with the anchor 36*a*, and moves in a direction in which the suction valve 30 comes into contact with the suction valve seat 31*a* (valve closing direction).

In a state where the suction valve 30 is in contact with the suction valve seat 31*a* (valve closed state), the rod 30*b* of the suction valve 30 is separated from the anchor assembly 36, and a gap t2 (see FIG. 6) is formed between the rod 30*b* and the anchor sleeve 36*b*. That is, the anchor sleeve (second anchor assembly component) 36*b* and the suction valve 30 are separated from each other by forming the gap t2 in the axial direction between the anchor sleeve 36*b* and the rod 30*b* in a state where the suction valve 30 is closed.

At this time, the suction valve 30 is closed by the biasing force of the anchor spring 33 and the fluid force caused by the fuel flowing into the low-pressure fuel suction passage 10*e*. After the valve is closed, the fuel pressure in the pressurizing chamber 11 rises together with the upward motion of the plunger 2. When the fuel pressure becomes equal to or higher than the pressure of the fuel discharge port 12, the high-pressure fuel is discharged through the discharge valve mechanism 8, and the high-pressure fuel is supplied to the common rail 23. Such a stroke is referred to as a discharge stroke.

That is, the upward stroke from the lower start point to the upper start point of the plunger 2 includes the return stroke and the discharge stroke. By controlling the timing of energizing the coil 43 of the electromagnetic valve mechanism 300, it is possible to control the amount of high-pressure fuel to be discharged.

The discharge valve mechanism 8 will be described with reference to FIG. 3.

The discharge valve mechanism 8 provided at an outlet of the pressurizing chamber 11 includes a discharge valve seat 8*a*, a discharge valve 8*b* that comes into and out of contact with the discharge valve seat 8*a*, a discharge valve spring 8*c* that biases the discharge valve 8*b* toward the discharge valve seat 8*a*, and a discharge valve stopper 8*d* that determines a stroke (movement distance) of the discharge valve 8*b*. The discharge valve stopper 8*d* is supported by a closing plug 38 that blocks a discharge valve chamber 12*a* from the outside, and is fixed to the pump body 1.

In a state where there is no fuel differential pressure between the pressurizing chamber 11 and the discharge valve chamber 12*a*, the discharge valve 8*b* is pressed against the discharge valve seat 8*a* by the biasing force of the discharge valve spring 8*c*, and turns in the valve closed state. In a case where the fuel pressure in the pressurizing chamber 11 becomes larger than the fuel pressure in the discharge valve chamber 12*a*, the discharge valve 8*b* opens against the discharge valve spring 8*c*. Then, the high-pressure fuel in the pressurizing chamber 11 is discharged to the common rail 23 via the discharge valve chamber 12*a*, a fuel discharge passage 12*b*, and the fuel discharge port 12. When the discharge valve 8*b* is opened, the discharge valve 8*b* comes into contact with the discharge valve stopper 8*d*, and the stroke is limited. Thus, the stroke of the discharge valve 8*b* is appropriately determined by the discharge valve stopper 8*d*. As described above, the discharge valve mechanism 8 is configured as a check valve that restricts the flow direction of the fuel.

The fuel discharge port 12 is formed in a discharge joint 60, and the discharge joint 60 is welded and fixed to the pump body 1.

Next, a relief valve mechanism 200 will be described with reference to FIGS. 2 and 3.

The relief valve mechanism 200 includes a relief body 201, a relief valve 202, a relief valve holder 203, a relief spring 204, and a spring stopper 205. The relief body 201 is provided with a tapered seat portion 201*a*. The relief valve 202 is loaded with the load of the relief spring 204 via the relief valve holder 203, pressed by the seat portion 201*a* of the relief body 201, and cuts off the fuel in cooperation with the seat portion 201*a*.

In a case where some problem occurs in the common rail or a member before the common rail 23, and the pressure of the fuel discharge port 12 becomes abnormally high, the relief valve 202 is opened when the pressure applied to the relief valve 202 exceeds the resultant force of the set load of the relief spring 204 and the in-cylinder pressure. The fuel is brought back into the pressurizing chamber 11 on the low-pressure side via the relief passage 213, and thus it is possible to lower the pressure of the fuel discharge port 12.

Figure 5:
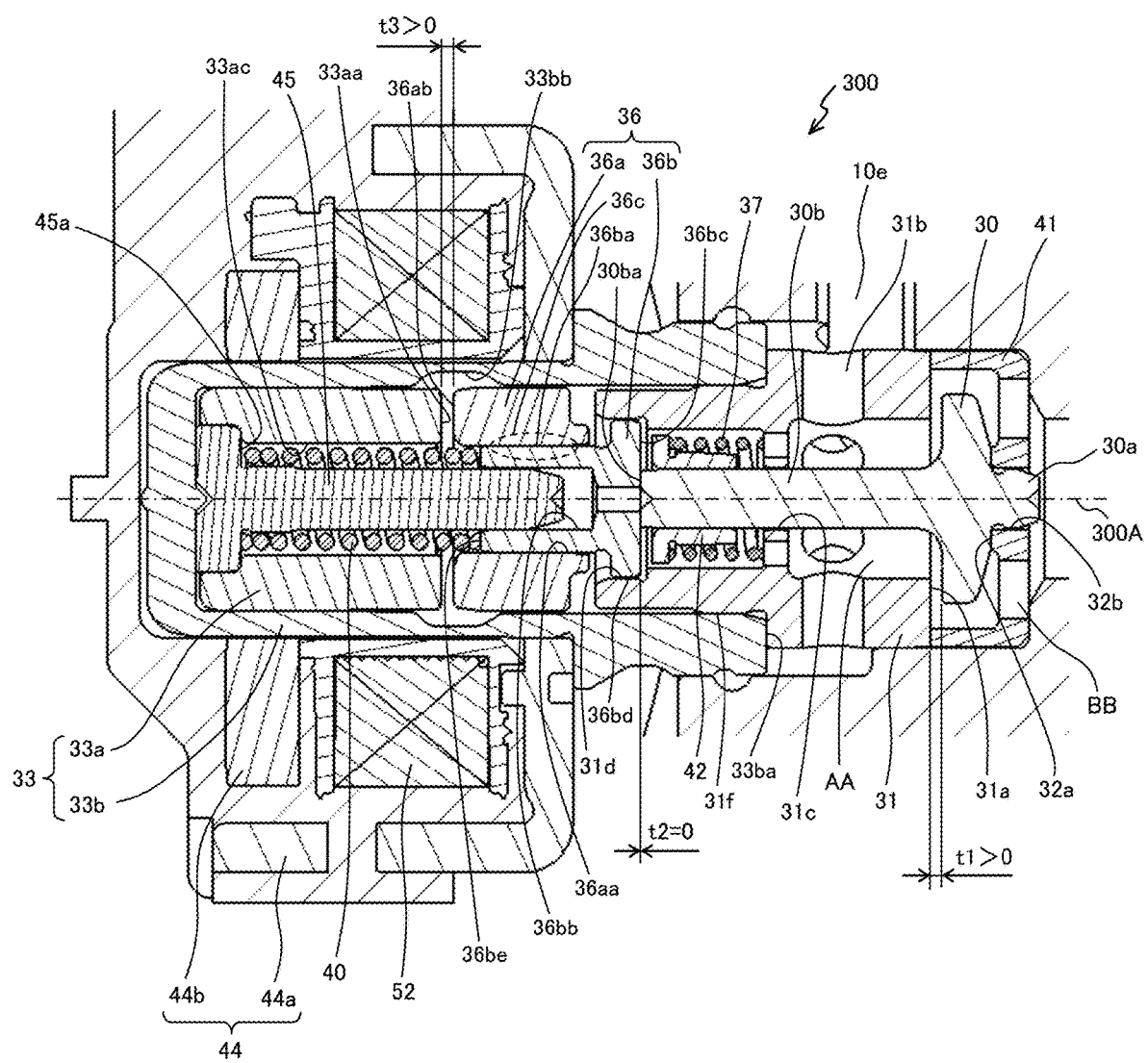
FIG. 5 is an enlarged cross-sectional view (valve open state) illustrating a vicinity of an electromagnetic valve mechanism 300 in FIG. 2 in an enlarged manner.
Figure 6:
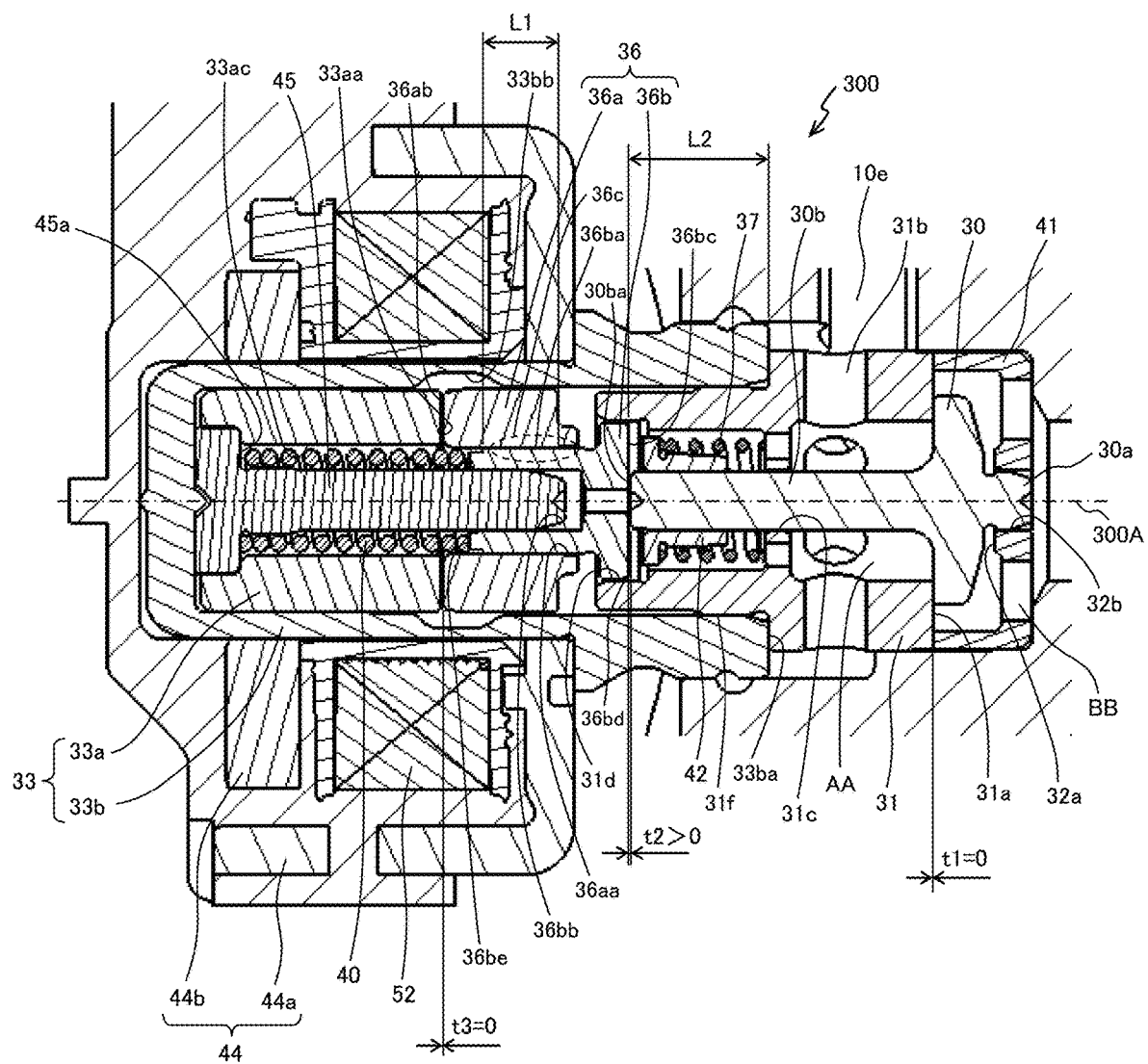
FIG. 6 is an enlarged cross-sectional view of the electromagnetic valve mechanism 300 in a valve closed state, similar to FIG. 2.

Next, the electromagnetic valve mechanism 300 in the present example will be described in more detail with reference to FIGS. 5 and 6. FIG. 5 is an enlarged cross-sectional view (valve open state) illustrating the vicinity of the electromagnetic valve mechanism 300 in FIG. 2 in an enlarged manner. FIG. 6 is an enlarged cross-sectional view of the electromagnetic valve mechanism 300 in the valve closed state, similar to FIG. 2.

FIG. 5 illustrates a state in which the suction valve 30 is opened in a state in which the electromagnetic coil 52 is not energized. FIG. 6 illustrates a state in which the suction valve 30 is closed in a state where the electromagnetic coil 52 is energized. In the present example, the suction valve 30 is configured such that the suction valve 30 is opened in a state where the electromagnetic coil 52 is not energized, and the suction valve 30 is closed in a state where the electromagnetic coil 52 is energized.

The suction valve 30 is provided with a protrusion 30*a* protruding in an axial direction 300A and a rod (anchor side protrusion) 30*b* in front and rear in a moving direction. That is, the suction valve 30 includes a valve portion 30*c* which is a main body portion abutting on the suction valve seat 31*a*, the protrusion 30*a*, and the rod 30*b*. The protrusion 30*a* is supported from the radial outside so as to be slidable in the axial direction 300A by an inner peripheral surface 32*b* of the suction valve stopper 32. The rod 30*b* is supported from the radial outside so as to be slidable in the axial direction 300A by a guide surface (inner peripheral surface) 31*c* formed in the suction valve seat member 31. Thus, the suction valve 30 is supported at two points in the axial direction 300A by the inner peripheral surface 32*b* and the guide surface 31*c*, and the inclination of the suction valve 30 with respect to the axial direction 300A is suppressed so that the suction valve 30 moves along the axial direction 300A during the valve opening/closing motion.

In the non-energized state, the suction valve 30 is configured to generate the biasing force on the stopper portion 32*a* side of the suction valve stopper 32 by the anchor spring 40 via the anchor assembly 36. The suction valve 30 is held in a state of being in contact with the stopper portion 32*a* of the suction valve stopper 32.

The suction valve stopper 32 is disposed such that a gap t1 between the suction valve 30 and the suction valve seat 31*a* becomes a target distance in a state where the suction valve 30 abuts on the stopper portion 32*a* of the suction valve stopper 32. As the distance of the gap t1 is set to be shorter, the valve opening/closing time of the suction valve 30 becomes shorter, and the flow rate controllability is improved. On the other hand, since the fuel passage area becomes smaller, the pressure loss of the fuel increases, and the fuel discharge efficiency decreases. Therefore, the gap t1 is set to an appropriate distance in which the valve opening/closing time of the suction valve 30 and the fuel discharge efficiency are balanced.

The suction valve seat 31*a* and the suction valve stopper 32 are provided with a fuel passage AA and a fuel passage BB, respectively. The fuel that has passed through the low-pressure fuel suction passage 10*e* from the damper chambers 10*c* and 10*d* is supplied into the pressurizing chamber 11 via the fuel passage AA, the gap t1, and the fuel passage BB.

A suction valve spring 37 and a suction valve spring stopper 42 are provided on the rod 30*b* of the suction valve 30. The suction valve spring 37 and the suction valve spring stopper 42 are configured to generate a force for biasing the suction valve 30 toward the anchor 36*a* side (anchor assembly 36 side). The biasing force of the suction valve spring 37 is set to be smaller than the biasing force of the anchor spring 40, and the force of the anchor spring 40 is dominant. The suction valve spring 37 has a function of assisting the movement of the suction valve 30 following the anchor 36*a* when the anchor 36*a* moves toward the core 33 when the valve is closed. Therefore, the suction valve spring 37 functions to cause the end portion 30*ba* of the rod 30*b* on the anchor assembly 36 side to abut on the end portion (end face) 36*bc* of the anchor sleeve 36*b* on the suction valve 30 side except when the suction valve 30 is closed. That is, except when the suction valve 30 is closed, the size of a gap t2 between the end portion 30*ba* of the rod 30*b* on the anchor assembly 36 side and the end portion 36*bc* of the anchor sleeve 36*b* on the suction valve 30 side is 0.

In the present example, the suction valve seat member 31 constitutes a housing that accommodates a portion of the anchor assembly 36, the suction valve spring 37, and a portion of the rod 30*b*, and has a sliding portion 31*c* that slides with the rod 30*b* on the inner peripheral portion. The suction valve seat member 31 includes a fixing portion 31*e* fixed to the outer core 33*b*. In the present example, the fixing portion 31*e* is configured by a press-fitting portion. The suction valve seat member (housing) 31, the suction valve 30, and the suction valve spring (second spring) 37 are configured as an integrated assembly component.

Next, a mechanism for controlling the valve opening/closing of the suction valve 30 will be described.

The valve opening/closing control of the suction valve is performed in a manner that, by energizing an electromagnetic coil 52, a magnetic attraction force is generated between the anchor 36*a* and the core 33, and the anchor 36*a* is moved toward the core 33.

A magnetic circuit through which the magnetic flux that generates the magnetic attraction force flows is configured by the anchor 36*a* (anchor assembly 36), the core (core assembly) 33, and a yoke (yoke assembly) 44. It is desirable that all materials of the anchor 36*a*, the core 33, and the yoke 44 be magnetic materials.

The yoke (yoke assembly) 44 includes a first yoke 44*a* that covers the outer peripheral side of the electromagnetic coil 52 and the end surface on the pump body 1 side, and a second yoke 44*b* that covers the end surface of the electromagnetic coil 52 on an opposite side of the pump body 1 side.

The core (core assembly) 33 is divided into two members of the inner core 33*a* and the outer core 33*b*, and is fixed by press-fitting the inner core 33*a* into an inner cylindrical portion (inner peripheral surface) of the outer core 33*b*.

In the inner cylindrical portion (inner peripheral surface) of the outer core 33*b*, an annular groove 33*bb* having a thickness that is partially reduced is provided in the vicinity of a contact surface between the anchor 36*a* and the core 33 (inner core 33*a*). This has an effect of increasing the magnetic attraction force by reducing the magnetic flux passing through the outer core 33*b* and guiding the magnetic flux so that a large amount of magnetic flux passes to the anchor 36*a* side.

The outer core 33*b* has a bottomed cylindrical shape, and one end 33*ba* on the side on which an opening portion is provided is inserted into the pump body 1 and fixed by welding. The magnetic material may have poor weldability. By dividing the core portion 33 into the inner core 33*a* and the outer core 33*b*, it is possible to select a material having good weldability as the material of the outer core 33*b*.

The anchor assembly 36 includes two components of the anchor 36*a* and the anchor sleeve 36*b*. The anchor 36*a* and the anchor sleeve 36*b* are fixed by press-fitting an outer cylindrical portion (outer peripheral surface) 36*ba* of the anchor sleeve 36*b* into an inner cylindrical portion (inner peripheral surface) 36*aa* of the anchor 36*a*. That is, the anchor (first anchor assembly component) 36*a* and the anchor sleeve (second anchor assembly component) 36*b* are fixed by a press-fitting portion 36*c* (portion indicated by L1 in FIG. 6).

A cylindrical hole 36*bb* recessed toward the suction valve 30 along the axial direction 300A is formed in an end surface of the anchor sleeve 36*b* on the core 33 side. The cylindrical hole 36*bb* serves as the sliding portion with an anchor support rod (anchor guide) 45 described later. An outer cylindrical portion (outer peripheral surface) 36*bd* of the anchor sleeve 36*b* on the suction valve 30 side serves as a sliding portion on the inner cylindrical portion (inner peripheral surface, guide surface) 31*d* of the suction valve seat member 31.

In the present example, the suction valve seat member 31 constitutes a guide portion 31*d* of the anchor 36*a*, and constitutes the guide surface (guide portion) 31*c* of the rod 30*b* as described above. The guide portion 31*d* of the anchor 36*a* and the guide portion 31*c* of the rod 30*b* may be configured to be divided into two members, but it is possible to reduce the number of components by being configured with one member.

The anchor sleeve 36*b* is slidably supported at two points of the anchor support rod 45 and the suction valve seat member 31 in the axial direction 300A, and the inclination of the anchor 36*a* with respect to the axial direction 300A is suppressed so that the anchor 36*a* moves along the axial direction 300A.

The core-side end surface of the anchor sleeve serves as a seat surface of the anchor spring. An end surface on the suction valve side, that faces the seat surface, is in contact with the protrusion of the suction valve, and transmits the anchor spring biasing force to the suction valve via the anchor sleeve.

As the material of the anchor sleeve 36*b*, martensitic stainless steel having high surface hardness is used. The sliding portion 36*bb* with the anchor support rod 45, the sliding portion 36*bd* with the suction valve seat member 31, an abutting portion 36*bc* with the rod 30*b* on the suction valve 30 side, and a seat surface 36*be* of the anchor spring 40 are made of materials that are hardly worn.

The anchor support rod 45 is held between the outer core 33*b* and the inner core 33*a*. That is, the anchor support rod 45 is sandwiched between the outer core 33*b* and the inner core 33*a*. By using martensitic stainless steel as the material of the anchor support rod 45, sliding wear with the anchor sleeve 36*b* is suppressed. Further, the anchor support rod 45 guides the inner periphery of the anchor spring 40 at an outer peripheral cylindrical portion, and is provided with a flat portion 45*a* constituting a seat surface of the anchor spring 40. That is, an end portion of the anchor spring (first spring) 40 on the anchor assembly 36 side abuts on a spring seat formed at the end portion 36*be* of the anchor sleeve (second anchor assembly component) 36*b*. Therefore, it is not necessary to form the seat surface of the anchor spring 40 in the outer core 33*b*, and thus it is possible to prevent wear of the outer core 33*b* due to the anchor spring 40.

The anchor spring 40 is stored radially inside (inner peripheral portion) of an inner cylindrical surface (inner peripheral surface) 33*ac* of the inner core 33*a* and the inner cylindrical surface (inner peripheral surface) 36*aa* of the anchor 36*a*, and movement in the radial direction is suppressed by expanded cylindrical surfaces 33*ac* and 36*aa* and the anchor support rod 45.

The anchor 36*a* and the inner core 33*a* are made of a magnetic material, and plating is performed on the respective collision surfaces in order to prevent wear due to collision between the anchor 36*a* and the core 33. In addition, a gap having a distance obtained by adding the plating thicknesses is provided when the valve is closed. Thus, it is possible to improve the drive responsiveness as compared with a case where the energization is released from a state where the anchor 36a and the core 33 are directly in contact with each other.

An appropriate distance is set such that a gap t3 (>0) is formed between the anchor 36a and the core 33 when the valve is opened, and a gap t2 (>0) is formed between the suction valve 30 and the anchor sleeve 36b when the valve is closed. As the distance (size) of the gap t3 when the valve is opened is set closer to the distance (size) of the gap t1, the valve opening/closing time of the suction valve 30 is reduced, and the flow rate controllability is improved. On the other hand, if individual variations of components related to the gap t2 are not taken into consideration, there is a possibility that the suction valve 30 does not abut on the suction valve seat 31a and it is not possible to seal the fuel even in a state where the anchor 36a abuts on the core 33 by energization.

In the present example, by adjusting the press-fitting distance L1 between the anchor 36a and the anchor sleeve 36b in accordance with individual variations of the components, the gap t2 (>0) is formed between the suction valve 30 and the anchor sleeve 36b when the valve is closed. The press-fitting portion 36c (portion indicated by L1 in FIG. 6) between the anchor (first anchor assembly component) 36a and the anchor sleeve (second anchor assembly component) 36b is set to a press-fitting length at which the anchor 36a and the suction valve 30 are separated from each other in a state where the suction valve 30 is closed.

Here, press-fitting means pressing one member (component) into a hole provided in the other member (component) by applying pressure. In a state before press-fitting, the outer diameter of the one member is formed to be larger than the inner diameter of the hole of the other member. In the state after the press-fitting, a strong force is generated between the inner peripheral surface of the hole of the other member and the outer diameter portion (outer peripheral surface) of the one member, and both members are fixed. In the press-fitting portion 36c in the present example, the outer diameter (diameter) of the outer cylindrical portion (outer peripheral surface) 36ba of the anchor sleeve 36b is larger than the inner diameter of the inner cylindrical surface (inner peripheral surface) 36aa of the anchor 36a. By press-fitting the outer cylindrical portion 36ba of the anchor sleeve 36b into the inner cylindrical surface 36aa of the anchor 36a, a strong fixing force is generated between the anchor sleeve 36b and the anchor 36a.

The same applies to a press-fitting portion of the fixing portion 31e.

By adjusting the press-fitting distance L1 between the anchor 36a and the anchor sleeve 36b, it is possible to absorb individual variations of components. In this case, as illustrated in FIG. 6, in a state where the anchor 36a abuts on the core 33, the press-fitting distance L1 is adjusted such that a distance L2 between the end portion (end surface) 33ba of the outer core 33b and the end portion (end surface) 36bc of the anchor sleeve 36b becomes a predetermined length. As a result, a variation in the distance L2 between the products falls within a predetermined tolerance.

According to the present example, it is possible to reliably secure a gap between the suction valve (valve body) 30 and the anchor assembly 36 (that is, the component on the anchor 36a side) in the valve closed state, regardless of the integration tolerance of a plurality of components. From the viewpoint of each component related to the gap, it is not necessary to strictly set the tolerance of each component, and it is easy to manufacture each component. Thus, the yield of each component is improved.

In addition, since the tolerance of each component is absorbed by the press-fitting distance L1, the maximum tolerance is integrated, so that it is possible to suppress the length of this gap from becoming unnecessarily long. Therefore, in the electromagnetic valve mechanism 300 in the present example, it is possible to improve the valve opening/closing responsiveness of the suction valve 30. As a result, in the high-pressure fuel supply pump 100 in the present example, it is possible to improve the discharge performance.

In addition, in the high-pressure fuel supply pump 100 in the present example, since an adjustment shim (adjuster) is not required, it is possible to reduce the number of components. Thus, a process of selecting the adjustment shim or assembling the adjustment shim is not required, and it is possible to reduce the number of components and simplify the assembly facility.

In addition, it is not necessary to measure the integrated tolerance of each component during assembly of the electromagnetic valve mechanism 300, and the work process is simplified. This makes it possible to eliminate a matching process of measuring the integrated tolerance of each component and selecting the adjustment shim in accordance with the measurement result.

In the anchor assembly 36 in the present example, the anchor 36a and the anchor sleeve 36b are assembled by press-fitting, and a welding-less structure is realized. The magnetic material used for the anchor 36a is a hardly weldable material, and a magnetic material suitable for the anchor 36a can be used due to a welding-less structure. In addition, due to the welding-less structure, welding equipment, check of welding quality, degreasing cleaning, and the like are unnecessary, and measures against sputtering occurring during welding are unnecessary.

Furthermore, in the anchor assembly 36 in the present example, it is possible to separate the material of the anchor 36a and the material of the anchor sleeve 36b from each other, to use a magnetic material suitable for the anchor 36a as described above, and to use a material having high wear resistance as described above for the anchor sleeve 36.

Furthermore, since the anchor assembly 36 in the present example does not have a structure of receiving the mass of the rod and operating integrally with the rod as in PTL 1, it is possible to reduce the weight of the anchor assembly 36 driven by the magnetic attraction force, and to improve the valve opening/closing responsiveness. Improvement in valve opening/closing responsiveness contributes to an increase in discharge flow rate and improvement in flow rate controllability. In addition, by reducing the weight of the anchor assembly 36, it is possible to reduce the collision force acting on the facing surfaces (collision portions) 33aa and 36ab of the anchor 36a and the core. It is possible to reduce the damage caused on the facing surfaces 33aa and 36ab, and to reduce the collision noise.

Furthermore, since the anchor assembly 36 in the present example is supported at two points by the sliding portion 36bb with the anchor support rod 45 and the sliding portion 36bd with the suction valve seat member 31, the inclination of the anchor assembly 36 with respect to the axial direction 300A is suppressed. Thus, it is possible to suppress partial contact of the anchor 36a with the facing surface (magnetic suction surface) 33aa of the core and to suppress the damage to the magnetic suction surface 33aa of the core or a coating film (plating or the like) coating the magnetic suction surface 33aa. In addition, it is possible to prevent fixing (burning) of the anchor 36a and the rod 30b on the sliding surface. In the structure in which the anchor assembly 36 is supported at two points (two places), it is possible to reduce the length of a support portion in the axial direction as compared with a structure in which the anchor assembly is supported at one point (one place), which contributes to weight reduction of the anchor assembly 36.

The electromagnetic valve mechanism 300 according to the present example described above has the following features.

(1) In an electromagnetic valve mechanism 300 including an anchor assembly 36 and a magnetic core 33 between which a magnetic attraction force acts, and a suction valve 30 configured to be able to come into and out of contact with the anchor assembly 36, the anchor assembly 36 includes a first anchor assembly component 36a having a facing surface 36ab that faces the magnetic core 33, a second anchor assembly component 36b configured integrally with the first anchor assembly component 36a, and a press-fitting portion 36c that fixes the first anchor assembly component 36a and the second anchor assembly component 36b. A press-fitting length L1 of the press-fitting portion 36c is set to a length at which the second anchor assembly component 36b and the suction valve 30 are separated from each other in a state where the suction valve 30 is closed.

(2) The second anchor assembly component 36b and the suction valve 30 are separated in the axial direction 300A in a state where the suction valve 30 is closed.

(3) The suction valve 30 includes the rod 30b that comes into and out of contact with the second anchor assembly 36b on a side facing the anchor assembly 36. The second anchor assembly component 36b and the suction valve 30 are separated from each other by forming the gap t2 in the axial direction 300A between the second anchor assembly component 36b and the rod 30b in a state where the suction valve 30 is closed.

(4) The first anchor assembly component 36a is made of a magnetic material, and the second anchor assembly component 36b is made of a material different from the material of the first anchor assembly component 36a.

(5) The magnetic core 33 includes the outer core 33b and the inner core 33a disposed on the inner peripheral portion of the outer core 33b.

(6) The inner core 33a is fixed to the inner peripheral portion of the outer core 33b, and the first spring 40 that biases the anchor assembly 36 in the valve opening direction is provided at the inner peripheral portion of the inner core 33a.

(7) The end portion of the first spring 40 on the anchor assembly 36 side abuts on the spring seat configured at the end portion 36be of the second anchor assembly component 36b.

(8) The housing 31 that accommodates a portion of the rod 30b in the inner peripheral portion and has the sliding portion 31c that slides on the rod 30b is provided, and the housing 31 includes the fixing portion 31f fixed to the outer core 33b.

(9) The second spring 37 that is disposed on the inner peripheral side of the housing 31 and biases the rod 30b in the valve closing direction is provided. The housing 31, the suction valve 30, and the second spring 37 are configured as an integrated assembly component. The fixing portion 31f for fixing the housing 31 to the outer core 33b is formed by the press-fitting portion.

(10) In the high-pressure fuel supply pump 100 including the electromagnetic valve mechanism constituting the variable capacity mechanism, the electromagnetic valve mechanism 300 includes the anchor assembly 36 and the magnetic core 33 between which the magnetic attraction force acts, and the suction valve 30 configured to be able to come into and out of contact with the anchor assembly 36. The anchor assembly 36 includes the first anchor assembly component 36a having the facing surface 36ab that faces the magnetic core 33, the second anchor assembly component 36b configured integrally with the first anchor assembly component 36a, and the press-fitting portion 36c that fixes the first anchor assembly component 36a and the second anchor assembly component 36b. The press-fitting length L1 of the press-fitting portion 36c is set to a length at which the second anchor assembly component 36b and the suction valve 30 are separated from each other in a state where the suction valve 30 is closed.

Note that, the present invention is not limited to the above example, and various modifications may be provided.

For example, the above example has been described in detail in order to explain the present invention in an easy-to-understand manner, and the above example is not necessarily limited to a case including all the configurations. In addition, it is possible to add another configuration to a portion of the configuration of the example or replace a portion of the configuration of the example with another configuration.

REFERENCE SIGNS LIST 30 suction valve
30b rod
31c sliding portion of housing 31 with rod 30b
31f fixing portion of housing 31 to outer core 33b
33 magnetic core
33a inner core
33b outer core
36 anchor assembly
36a first anchor assembly component
36ab facing surface of anchor assembly 36 facing magnetic core 33
36b second anchor assembly component
36be spring seat of first spring 40
36c press-fitting portion between first anchor assembly component 36a and second anchor assembly component 36b
37 second spring
40 first spring
300 electromagnetic valve mechanism
300A axial direction
L1 press-fitting length between second anchor assembly component 36b and suction valve 30
t2 gap between second anchor assembly component 36b and rod 30b in axial direction when valve is closed

The invention claimed is:

1. An electromagnetic valve mechanism, comprising:
an anchor assembly and a magnetic core between which a magnetic attraction force acts; and
a suction valve configured to be able to come into and out of contact with the anchor assembly,
wherein the anchor assembly includes
a first anchor assembly component having a facing surface that faces the magnetic core,
a second anchor assembly component configured integrally with the first anchor assembly component,
wherein the suction valve includes a rod on a side facing the anchor assembly, the rod disposed to come into and out of contact with the second anchor assembly component, a press-fitting portion that fixes the first anchor assembly component and the second anchor assembly component, and a press-fitting length of the press-fitting portion is set to a length at which the second anchor assembly component and the suction valve are separated from each other by forming a gap in an axial direction between the second anchor assembly component and the rod in a state where the suction valve is closed.

2. The electromagnetic valve mechanism according to claim 1, wherein the first anchor assembly component is made of a magnetic material, and the second anchor assembly component is made of a material different from a material of the first anchor assembly component.

3. The electromagnetic valve mechanism according to claim 1, wherein the magnetic core includes an outer core, and an inner core disposed on an inner peripheral portion of the outer core.

4. The electromagnetic valve mechanism according to claim 3, wherein the inner core is fixed to the inner peripheral portion of the outer core, and the inner core includes a first spring that biases the anchor assembly in a valve opening direction, on an inner peripheral portion of the inner core.

5. The electromagnetic valve mechanism according to claim 4, wherein an end portion of the first spring on the anchor assembly side abuts on a spring seat configured at an end portion of the second anchor assembly component.

6. The electromagnetic valve mechanism according to claim 3, further comprising a housing that accommodates a portion of the rod in an inner peripheral portion and includes a sliding portion that slides on the rod, wherein the housing includes a fixing portion fixed to the outer core.

7. The electromagnetic valve mechanism according to claim 6, further comprising a second spring that is disposed on an inner peripheral side of the housing and biases the rod in a valve closing direction, wherein the housing, the suction valve, and the second spring are configured as an integrated assembly component, and the fixing portion that fixes the housing to the outer core is formed by the press-fitting portion.

8. A high-pressure fuel supply pump comprising an electromagnetic valve mechanism constituting a variable capacity mechanism, wherein the electromagnetic valve mechanism includes an anchor assembly and a magnetic core between which a magnetic attraction force acts, and a suction valve configured to be able to come into and out of contact with the anchor assembly, the anchor assembly includes a first anchor assembly component having a facing surface that faces the magnetic core, a second anchor assembly component configured integrally with the first anchor assembly component, wherein the suction valve includes a rod on a side facing the anchor assembly, the rod disposed to come into and out of contact with the second anchor assembly component, a press-fitting portion that fixes the first anchor assembly component and the second anchor assembly component, and a press-fitting length of the press-fitting portion is set to a length at which the second anchor assembly component and the suction valve are separated from each other by forming a gap in an axial direction between the second anchor assembly component and the rod in a state where the suction valve is closed.

* * * * *